(12) United States Patent
Hodges

(10) Patent No.: US 6,910,239 B2
(45) Date of Patent: Jun. 28, 2005

(54) DOCK LEVELER HAVING AN INFLATABLE MEMBER

(75) Inventor: Charles Harwood Hodges, Ruxton, MD (US)

(73) Assignee: Kelly Company, Inc., Milwaukee, WI (US)

(*) Notice: Subject to any disclaimer, the term of this patent is extended or adjusted under 35 U.S.C. 154(b) by 0 days.

(21) Appl. No.: 10/846,276

(22) Filed: May 14, 2004

(65) Prior Publication Data

US 2004/0205913 A1 Oct. 21, 2004

Related U.S. Application Data

(63) Continuation of application No. 10/369,420, filed on Feb. 18, 2003, now Pat. No. 6,760,944, which is a continuation of application No. 10/222,444, filed on Aug. 16, 2002, now Pat. No. 6,711,774, which is a continuation of application No. 10/005,395, filed on Dec. 3, 2001, now Pat. No. 6,460,212, which is a continuation of application No. 09/613,224, filed on Jul. 10, 2000, now abandoned, which is a continuation of application No. 09/456,207, filed on Dec. 7, 1999, now abandoned, which is a continuation of application No. 09/093,234, filed on Jun. 8, 1998, now Pat. No. 5,996,156, which is a continuation of application No. 08/531,011, filed on Sep. 20, 1995, now Pat. No. 5,802,650, which is a continuation of application No. 08/131,983, filed on Oct. 4, 1993, now Pat. No. 5,471,693.

(51) Int. Cl.$^7$ ............................................. E01D 1/00
(52) U.S. Cl. ........................................................ 14/71.3
(58) Field of Search ........................... 14/69.5, 71.1, 14/71.3; 254/89 H, 93 HP

(56) References Cited

U.S. PATENT DOCUMENTS

| 2,070,960 A | 2/1937 | Philips |
| 2,495,092 A | 1/1950 | Cox et al. |
| 2,610,824 A | 9/1952 | Grier |
| 2,689,956 A | 9/1954 | Fenton |
| 2,804,114 A | 8/1957 | Bayerkohler |

(Continued)

FOREIGN PATENT DOCUMENTS

| AT | 165168 | 6/1949 |
| DE | 1 207 221 | 12/1965 |
| DE | 2354388 | 3/1974 |
| DE | 27 21 384 A1 | 11/1978 |
| DE | 37 43 551 A1 | 7/1989 |
| EP | 0 001 316 | 4/1979 |
| EP | 0 386 850 | 12/1990 |
| GB | 835 142 | 5/1960 |
| GB | 930163 | 7/1963 |
| GB | 2 145 041 A | 3/1985 |
| GB | 2 206 158 A | 12/1988 |
| NL | 7710543 | 3/1979 |
| SU | 161243 | 7/1964 |
| SU | 931701 | 5/1982 |
| SU | 1362826 A1 | 12/1987 |
| WO | WO 9011204 | 10/1990 |
| WO | WO 93/13267 | 7/1993 |

OTHER PUBLICATIONS

Rite–Hite Semi–Automatic Dock Leveler, Specifications and Pit Details—2 pages.

Primary Examiner—Gary S. Hartmann
(74) Attorney, Agent, or Firm—Michael Best & Friedrich LLP

(57) ABSTRACT

A dock leveler for use in a loading dock. The dock leveler includes a ramp, an inflatable assembly, and a support structure. The ramp pivots between a generally horizontal lowered position and an upwardly-inclined raised position. The inflatable assembly is positioned under the ramp and adapted to generate a force. The support structure is positioned between the inflatable assembly and the ramp and adapted to transfer the force of the inflatable assembly to the bottom of the ramp to move the ramp from the lowered position to the raised position. A conduit fluidly connects to the inflatable assembly through the support structure.

5 Claims, 2 Drawing Sheets

U.S. PATENT DOCUMENTS

| | | |
|---|---|---|
| 2,846,703 A | 8/1958 | Adley |
| 3,012,804 A | 12/1961 | Jeavons |
| 3,117,332 A | 1/1964 | Kelley et al. |
| 3,211,425 A | 10/1965 | Greulich et al. |
| 3,379,411 A | 4/1968 | Vanderjagt |
| 3,521,861 A | 7/1970 | Freudenthal et al. |
| 3,528,118 A | 9/1970 | Smith |
| 3,628,487 A | 12/1971 | Bennett |
| 3,659,899 A | 5/1972 | Phillips et al. |
| 3,685,077 A | 8/1972 | Wiener et al. |
| 3,711,157 A | 1/1973 | Smock |
| 3,763,514 A | 10/1973 | Bishop |
| 3,784,255 A | 1/1974 | Smock |
| 3,799,504 A | 3/1974 | Vaughen |
| 3,835,497 A | 9/1974 | Smith |
| 3,977,349 A | 8/1976 | Hummel |
| 3,997,932 A | 12/1976 | Artzberger |
| 4,012,804 A | 3/1977 | Catlett |
| 4,036,472 A | 7/1977 | Orndorff, Jr. |
| 4,060,170 A | 11/1977 | Walters |
| 4,061,310 A | 12/1977 | Vetter |
| 4,081,874 A | 4/1978 | Artzberger |
| 4,110,860 A | 9/1978 | Neff et al. |
| 4,149,469 A | 4/1979 | Bigler |
| 4,169,296 A | 10/1979 | Wipkink et al. |
| 4,257,136 A | 3/1981 | Loblock |
| 4,293,969 A | 10/1981 | Frommelt |
| 4,319,666 A | 3/1982 | Hunter |
| 4,343,058 A | 8/1982 | Loblick |
| 4,455,703 A | 6/1984 | Fromme et al. |
| 4,538,311 A | 9/1985 | Hall et al. |
| 4,570,277 A | 2/1986 | Hahn et al. |
| 4,572,579 A | 2/1986 | Saito |
| 4,619,008 A | 10/1986 | Kovach et al. |
| 4,629,162 A | 12/1986 | Porche |
| 4,665,579 A | 5/1987 | Bennett et al. |
| 4,688,760 A | 8/1987 | Garman et al. |
| 4,735,457 A | 4/1988 | Bonerb et al. |
| 4,776,052 A | 10/1988 | Delgado et al. |
| 4,782,542 A | 11/1988 | Sato |
| 4,786,032 A | 11/1988 | Garman et al. |
| 4,861,215 A | 8/1989 | Bonerb |
| 4,922,568 A | 5/1990 | Hageman |
| 4,937,906 A | 7/1990 | Alexander |
| 4,948,107 A | 8/1990 | Orndorff, Jr. |
| 4,955,923 A | 9/1990 | Hageman |
| 5,042,103 A | 8/1991 | Megens |
| 5,067,774 A | 11/1991 | Trowland |
| 5,088,143 A | 2/1992 | Alexander |
| 5,178,367 A | 1/1993 | Vaughen |
| 5,232,202 A | 8/1993 | Watson |
| 5,299,386 A | 4/1994 | Naegelli et al. |
| 5,414,886 A | 5/1995 | Sust et al. |
| 5,446,938 A | 9/1995 | Warner et al. |
| 5,450,643 A | 9/1995 | Warner |
| 5,471,693 A | 12/1995 | Hodges |
| 5,475,888 A | 12/1995 | Massey |
| 5,481,774 A | 1/1996 | Hodges et al. |
| 5,500,968 A | 3/1996 | Hodges |
| 5,522,107 A | 6/1996 | Hageman et al. |
| 5,522,108 A | 6/1996 | Massey et al. |
| 5,600,859 A | 2/1997 | Hodges et al. |
| 5,669,086 A | 9/1997 | German |
| 5,802,650 A | 9/1998 | Massey |
| 5,802,651 A | 9/1998 | Massey et al. |
| 5,996,156 A | 12/1999 | Massey |
| 6,216,303 B1 | 4/2001 | Massey |

DOCK LEVELER HAVING AN INFLATABLE MEMBER

REFERENCE TO RELATED APPLICATIONS

This application is a continuation of U.S. patent application Ser. No. 10/369,420 filed Feb. 18, 2003, now U.S. Pat. No. 6,760,944, which is a continuation of U.S. patent application Ser. No. 10/222,444 filed Aug. 16, 2002, now U.S. Pat. No. 6,711,774, which is a continuation of U.S. patent application Ser. No. 10/005,395 filed Dec. 3, 2001, now U.S. Pat. No. 6,460,212, which is a continuation of U.S. patent application Ser. No. 09/613,224 filed Jul. 10, 2000, now abandoned, which is a continuation of U.S. patent application Ser. No. 09/456,207 filed Dec. 7, 1999 now abandoned, which is a continuation of U.S. patent application Ser. No. 09/093,234 filed Jun. 8, 1998, now U.S. Pat. No. 5,996,156, which is a continuation-in-part of U.S. patent application Ser. No. 08/531,011 filed Sep. 20, 1995, now U.S. Pat. No. 5,802,650, which is a continuation-in-part of U.S. patent application Ser. No. 08/131,983 filed Oct. 4, 1993, now U.S. Pat. No. 5,471,693, all of which are incorporated herein by reference in their entirety.

FIELD OF THE INVENTION

The invention relates to dock levelers, and more particularly to dock levelers having inflatable members.

BACKGROUND OF THE INVENTION

Dock levelers or dock boards are mounted on loading docks and are adapted to bridge the gap between the dock and the bed of a truck or carrier parked in front of the dock to enable material handling equipment, such as a forklift truck to move between the dock and the truck bed.

The typical dock leveler includes a frame or supporting structure which is mounted in a pit or depression in the loading dock and the rear end of a ramp or deck plate is pivoted to the supporting structure so that the ramp is movable between a horizontal cross traffic position and an upwardly inclined position.

Hinged to the forward end of the ramp is an extension lip that is movable between a downwardly hanging pendant position and an extended position where the lip forms an extension to the ramp.

After a truck has parked in front of the loading dock in preparation for a loading operation, the ramp of the conventional dock leveler is pivoted upwardly and as the ramp approaches its upwardly inclined position, the lip is pivoted outwardly to the extended position. As the ramp is subsequently lowered, the extended lip will engage the bed of the truck. After the loading operation has been completed, the lip will fall by gravity to the pendent position as the truck pulls away from the loading dock.

Traditionally, the ramp of the dock leveler has been operated either by a mechanical or hydraulic mechanism. With a typical mechanical operation, an extension spring is mounted in the pit beneath the ramp and is connected through a lever arm to the rear edge of the ramp. When a ramp holddown mechanism is released, the force of the spring will pivot the ramp to the upwardly inclined position.

With a hydraulically-operated dock leveler, a hydraulic cylinder unit is connected between the supporting frame and the ramp and through extension of the cylinder unit, the ramp will be pivoted to the upwardly inclined position.

U.S. patent application Ser. No. 07/814,002, filed Dec. 26, 1991, now abandoned, describes an inflatable bag mechanism that is utilized to pivot the ramp to the upwardly inclined position. As described in that patent application, a pleated bag is interposed between the bottom of the pit in the loading dock and the undersurface of the ramp. By inflating the bag with low pressure air, the ramp will be pivoted to the upwardly inclined position.

SUMMARY OF THE INVENTION

One embodiment of the present invention includes a dock leveler for use in a loading dock. The dock leveler includes a ramp, an inflatable assembly, and a support structure. The ramp pivots between a generally horizontal lowered position and an upwardly-inclined raised position. The inflatable assembly is positioned under the ramp and adapted to generate a force. The support structure is positioned between the inflatable assembly and the ramp and adapted to transfer the force of the inflatable assembly to the bottom of the ramp to move the ramp from the lowered position to the raised position. A conduit fluidly connects to the inflatable assembly through the support structure.

Other features and advantages of the invention will become apparent to those skilled in the art upon review of the following detailed description, claims, and drawings.

Figure 1:
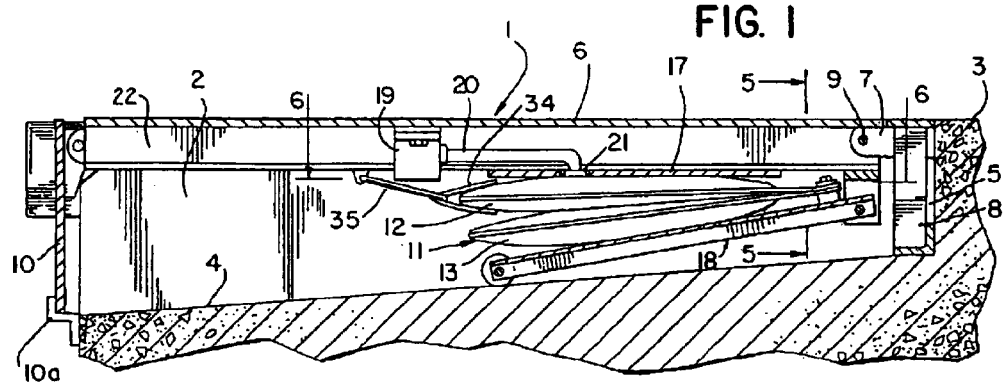
FIG. 1 is a vertical section of a dock leveler incorporating the invention with the ramp being shown in the horizontal position.
Figure 6:
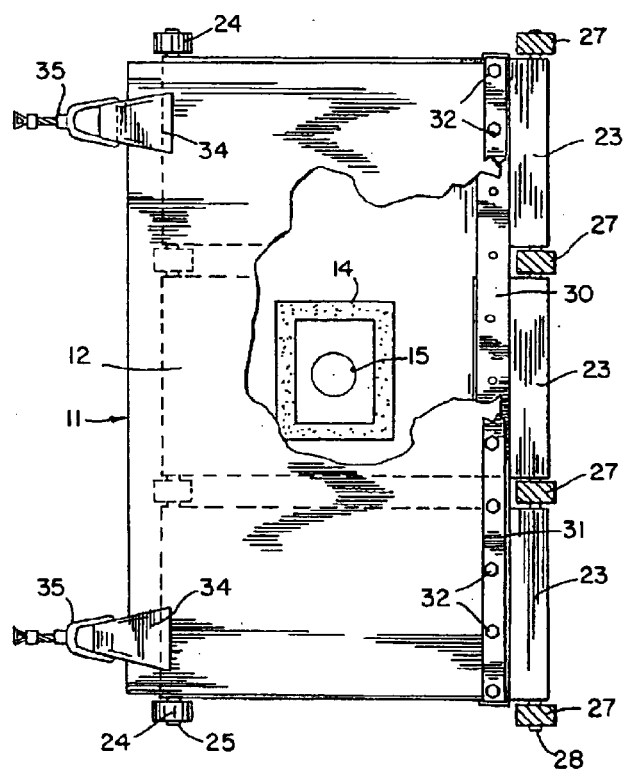
FIG. 6 is a section taken along line 6—6 of FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
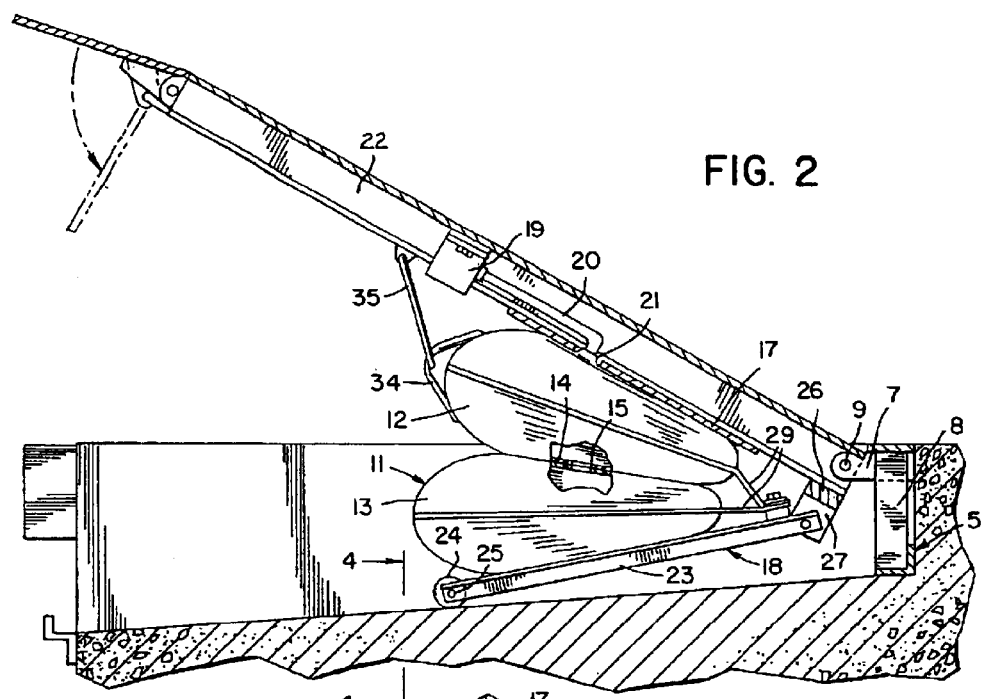
FIG. 2 is a view similar to FIG. 1 showing the ramp in the upwardly inclined position.

FIG. 1 illustrates a dock leveler 1 which is mounted in a pit or depression 2 in a loading dock 3. The lower surface or floor 4 of pit 2 slopes downwardly and forwardly as seen in FIGS. 1 and 2. Dock leveler 1 is adapted to bridge the gap between the upper surface of the loading dock 3 and the bed of a truck or carrier parked in front of the loading dock.

Dock leveler 1 includes a frame or supporting structure 5, which is mounted in the rear of pit 2, and the rear end of a ramp or deck plate 6 is pivoted to the frame 5, so that the ramp is movable between a generally horizontal cross traffic position, where the ramp is flush with the upper surface of dock 3, and an upwardly-inclined position, as shown in FIG. 2.

To pivot the ramp 6 to frame 5, a series of lugs 7 are mounted on vertical legs 8 of frame 5 and are pivoted through a hinge pin 9 to the rear end of ramp 6.

Hinged to the forward end of ramp 6 is an extension lip 10 which is adapted to be pivoted from a downwardly hanging pendant position, as shown in FIG. 1 to an outwardly extending position, as shown in FIG. 2, where the lip forms an extension to ramp 6. Lip 10 can be moved from the pendant to the extension position and held in that position by various mechanical hydraulic or pneumatic mechanisms, and the lip lifting and latching mechanism is not, in itself, a part of the present invention.

When the ramp is in the horizontal position, as shown in FIG. 1, and the lip 10 is pendant, the lower-end of the lip is retained within keepers 10a, which are mounted on the front face of dock 3. Engagement of lip 10 with keepers 10a maintains the ramp in the horizontal position.

An inflatable bag assembly 11 is located in pit 2 beneath the ramp 6, and by inflating the bag assembly ramp 6 can be pivoted from the horizontal to the upwardly inclined position. Bag assembly 11 is composed of a pair of vertically superimposed bags 12 and 13. While the drawings show a pair of bags 12 and 13, it is contemplated that any number of stacked bags can be utilized in the bag assembly.

The construction of the bag assembly 11 can be similar to that described in U.S. Pat. No. 5,446,938.

Bags 12 and 13 are preferably formed of fabric, such as nylon or polyester, impregnated with a thermoplastic resin and have contiguous horizontal surfaces which are joined together along an annular sealed area 14 that borders an unsealed central area. One or more holes 15 extend through the central area to provide communication between the interiors of the bags 12 and 13.

The upper surface of bag assembly 11 bears against an upper plate 17 which is mounted to the underside of ramp 6, while the lower surface of the bag assembly is supported on a bag support member or frame 18.

To inflate bag assembly 11, a low pressure fan 19, similar to that described in pending U.S. patent application Ser. No. 07/814,002, filed Dec. 26, 1991, now abandoned, is mounted to the undersurface of ramp 5 between the parallel beams 22 of the ramp 6. The outlet of fan 19 is connected through an air line 20 to a fitting 21 in bag 12. With this construction operation of fan 19 will inflate bags 12 and 13. When operation of fan 19 is terminated, the weight of the ramp 6 will deflate the bags 12 and 13, exhausting the air through the fan 19.

Figure 5:
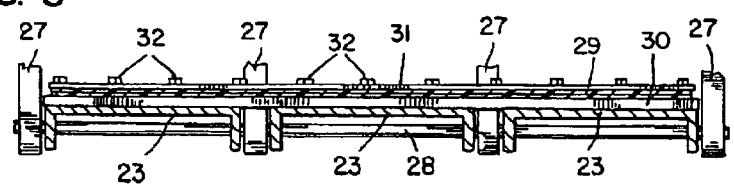
FIG. 5 is a section taken along line 5—5 of FIG. 1.
Figure 4:
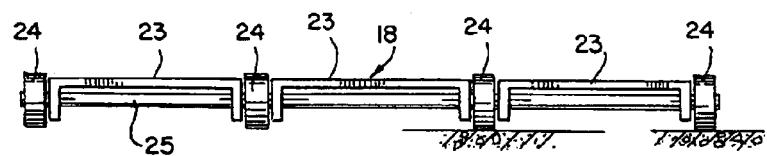
FIG. 4 is a section taken along line 4—4 of FIG. 2.

The bag support member 18, as best shown in FIGS. 4 and 5 is composed of a plurality of parallel, spaced, channel-shaped sections 23. Rollers 24 are located between adjacent sections 23 and similar rollers 24 are located outboard of the outer sections 23. Rollers 24 are journaled on a shaft 25 that extends through the flanges of the channel-shaped sections 23.

As shown in FIGS. 1 and 2, rollers 24, which are located at the forward end of the bag support member 18, are adapted to ride on the sloping floor 4 of pit 2, as the ramp is raised and lowered.

As a feature of the invention, the rear end of the bag support member 18 is pivoted to the rear end of ramp 6. In this regard, a cross bar 26 is mounted to the underside of the ramp and extends transversely of the ramp, and a series of lugs 27 extend downwardly from cross bar 26. A pivot shaft 28 extends through aligned holes in lugs 27, as well as in the flanges of the channel-shaped sections 23, and serves to pivotally connect the bag support member 18 to the ramp.

Figure 3:
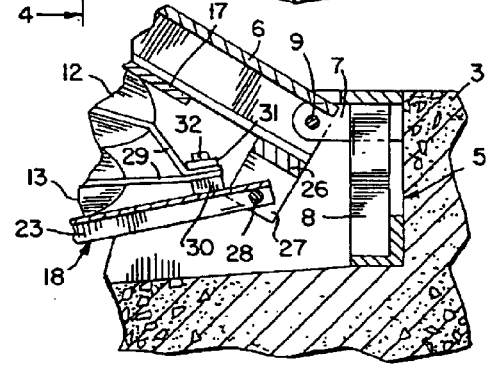
FIG. 3 is an enlarged fragmentary vertical section showing the attachment of the bag support member to the ramp.

Each of the bags 12 and 13 is provided with a rearwardly extending strip or tether 29 and the tethers are secured to the rear end of bag support member 18, as best illustrated in FIG. 3. A cross bar 30 extends transversely across the upper surfaces of the sections 23, and the tethers 29 are secured to the cross bar through a clamping bar 31 and bolts 32. The tethers 29 prevent the bags 12 and 13 from squeezing forwardly as the bags are inflated to elevate the ramp 6.

As the bag support member 18 is connected directly to the ramp 6, the bag support member will move forwardly with the ramp as the ramp is pivoted upwardly and the rollers 24 permit the bag support member to ride on the pit floor 4, as the ramp is raised and lowered. As the ramp 6 and bag support member 18 move together, relative movement between the bag assembly 11 and ramp plate 17 and bag support member 18 is minimized.

If bag support member 18 was not tied to ramp 6 and instead was connected to frame 5, the ramp would tend to move forwardly to a greater extent than the bag support member as the bag was inflated and the ramp was elevated. Initially, friction would tend to hold the bag in engagement with the ramp plate and the bag supporting plate, but as the bag was further inflated, the frictional forces are overcome causing the bag to snap forwardly. This action would put a strain on the tethers. Further, the relative movement between the upper and lower surfaces of the bag against the ramp plate and the bag support member could cause undue wear on the bag surfaces.

As a feature of the invention, the upper surface face of bag 12 is connected to the plate 17, preferably by a removable connection. As shown in the drawings, the releasable connection can take the form of a pair of loops 34 secured to the forward end of upper bag 12, and the loops are each connected through a strap or cord 35 to the underside of ramp 6. Engagement of straps 35 and loops 34 will prevent the bag assembly 11 from collapsing downwardly against the bag supporting member 18 when operation of fan 19 is discontinued and will maintain the bag volume. For example, when the ramp 6 descends from the upwardly inclined position shown in FIG. 2, due to discontinuation of operation of fan 19, the extended lip 10 will engage the truck bed, but the bag assembly 11 will maintain its volume and will not collapse against the bag support member 18, due to the connections 34,35. If the truck bed is above the level of dock 3 and the truck subsequently pulls away from the dock, the ramp will further descend, compressing the air within the bag assembly 11, and exhausting the air through the restriction of fan 19. Thus, the ramp will descend slowly, enabling the lip 10 to fall to its pendant position where it can engage the keepers 10a on the dock face.

The connection between the bag assembly 11 and the ramp plate 17 is also important in situations where the ramp may be at a downwardly inclined position during the loading operation. When the truck subsequently pulls away from the dock with the ramp 6 in this downwardly inclined position, the lip 10 will not be in position to engage the keepers 10a, with the result that the ramp will descend and bottom out in the pit 2. With the connection between the plate 17 and the bag assembly 11, which retains the bag volume, the descent of the ramp will be slowed, so it will not slam into the pit floor.

While the drawings show the releasable connection to be straps 35 and loops 34, it is contemplated that various types of connections can be employed to connect the upper end of bag assembly 11 to the ramp plate 17 or the ramp 6, to thereby prevent the deflated bag assembly from collapsing downwardly against the bag support member 18.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. A dock leveler for use in a loading dock, the dock leveler comprising:

a ramp pivotal between a generally horizontal lowered position and an upwardly-inclined raised position;

an inflatable assembly positioned under the ramp and adapted to generate a force;

a support structure positioned between the inflatable assembly and the ramp and adapted to transfer the force of the inflatable assembly to the bottom of the ramp to move the ramp from the lowered position to the raised position; and a conduit fluidly connected to the inflatable assembly through the support structure.

2. The dock leveler of claim 1, wherein the conduit fluidly connects to the top of the inflatable assembly, and wherein the conduit provides gas to the top of the inflatable assembly.

3. The dock leveler of claim 1, wherein the ramp includes at least two beams, and wherein the support structure is adapted to transfer the force of the inflatable assembly to the at least two beams.

4. The dock leveler of claim 1, wherein the support structure is a plate.

5. The dock leveler of claim 4, wherein the plate has an aperture, and wherein the conduit is connected to the inflatable assembly through the aperture.

* * * * *

UNITED STATES PATENT AND TRADEMARK OFFICE
CERTIFICATE OF CORRECTION

PATENT NO. : 6,910,239 B2  
DATED : June 28, 2005  
INVENTOR(S) : Charles Harwood Hodges It is certified that error appears in the above-identified patent and that said Letters Patent is hereby corrected as shown below:

<u>Title page,</u>  
Item [73], Assignee, delete "Kelly", and insert -- Kelley --.

Signed and Sealed this

Twenty-third Day of August, 2005

JON W. DUDAS  
*Director of the United States Patent and Trademark Office*